US012756794B2

(12) United States Patent
Huang et al.

(10) Patent No.: US 12,756,794 B2
(45) Date of Patent: Oct. 6, 2026

(54) VIDEO TRANSMISSION METHOD, CONFERENCING SYSTEM, AND STORAGE MEDIA

(71) Applicant: Guangzhou Shizhen Information Technology Co., Ltd., Guangzhou (CN)

(72) Inventors: Sheng Huang, Guangzhou (CN); Yuji Ouyang, Guangzhou (CN)

(73) Assignee: Guangzhou Shizhen Information Technology Co., Ltd., Guangzhou (CN)

( * ) Notice: Subject to any disclaimer, the term of this patent is extended or adjusted under 35 U.S.C. 154(b) by 167 days.

(21) Appl. No.: 18/885,128

(22) Filed: Sep. 13, 2024

(65) Prior Publication Data

US 2025/0097383 A1 Mar. 20, 2025

Related U.S. Application Data

(63) Continuation of application No. PCT/CN2023/118930, filed on Sep. 14, 2023.

(51) Int. Cl.
*H04N 7/15* (2006.01)
*G06F 3/14* (2006.01)
(Continued)

(52) U.S. Cl.
CPC ............. *H04N 7/15* (2013.01); *G06F 3/1454* (2013.01); *H04N 7/0117* (2013.01); *H04N 7/147* (2013.01)

(58) Field of Classification Search
CPC ........ H04N 7/15; H04N 7/0117; H04N 7/147; G06F 3/1454; H04W 4/80
(Continued)

(56) References Cited

U.S. PATENT DOCUMENTS

2015/0229933 A1* 8/2015 Guo ........................ H04N 19/12
375/240.02
2018/0227340 A1 8/2018 Jaynes et al.
2020/0396416 A1* 12/2020 Jaynes ................ H04L 12/1822

FOREIGN PATENT DOCUMENTS

CN 110248131 A 9/2019
CN 111193898 A 5/2020
(Continued)

OTHER PUBLICATIONS

International Search Report and Written Opinion in International Appln. No. PCT/CN2023/118930, mailed on May 24, 2024, 8 pages, with English Translation.
(Continued)

*Primary Examiner* — Duc Nguyen
*Assistant Examiner* — Carissa A Jones
(74) *Attorney, Agent, or Firm* — Fish & Richardson P.C.

(57) ABSTRACT

Video transmission methods, apparatuses, conferencing systems, and storage media are described. An example wireless screen sharing device includes an interface and is connected to a screen sharing receiving device. An example method includes connecting with the client device through the interface; configuring the interface to create a camera peripheral device; when it is recognized that a decoding application is running on the client device, transmitting first notification information to the screen sharing receiving device; transmitting the video data in the first data format to the decoding application; presenting the video data in the second data format to the conferencing software through the camera peripheral device; or when it is recognized that the decoding application is not running on the client device, transmitting second notification information to the screen sharing receiving device; and transmitting the video data in
(Continued)

the third data format to the conferencing software through the camera peripheral device.

20 Claims, 6 Drawing Sheets

(51) Int. Cl.
*H04N 7/01* (2006.01)
*H04N 7/14* (2006.01)

(58) Field of Classification Search
USPC ......... 348/14.01, 14.02, 14.04, 14.08, 14.09, 348/14.1, 14.12, 14.13
See application file for complete search history.

(56) References Cited

FOREIGN PATENT DOCUMENTS

| | | |
|---|---|---|
| CN | 111386700 A | 7/2020 |
| CN | 115514917 A | 12/2022 |

OTHER PUBLICATIONS

Extended European Search Report in European Appln No. 23924473.4, dated Apr. 22, 2025, 9 pages.
International Preliminary Report on Patentability in International Appln. No. PCT/CN2023/118930, mailed on Mar. 26, 2026, 8 pages (with English translation).

* cited by examiner

VIDEO TRANSMISSION METHOD, CONFERENCING SYSTEM, AND STORAGE MEDIA

CROSS-REFERENCE TO RELATED APPLICATION

This application is a continuation of International Application No. PCT/CN2023/118930, filed on Sep. 14, 2023. The aforementioned patent application is hereby incorporated by reference in their entirety.

FIELD

The present disclosure relates to the field of video transmission technology, in particular to a video transmission method, a conferencing system, and a storage medium.

BACKGROUND

Currently, it is common for users to install remote conferencing software (such as Zoom, TEAMS, Tencent Meeting, Mailing, etc.) on client devices such as computers, phones, tablets, etc., and use remote conferencing software to hold meetings with other online users. During the meeting, a wireless screen sharing device may be used to call a camera head connected to the screen transmission receiver, thereby achieving the use of a camera head connected to the screen transmission receiver for meetings.

However, some wireless screen sharing devices do not have video decoding capabilities. In this case, after receiving the compressed and encoded video stream transmitted by the interactive board, the wireless screen sharing device may not decode it, which may cause conferencing software on the computer to be unable to play the compressed and encoded video stream normally.

SUMMARY

The present disclosure provides a video transmission method, a conferencing system, and a storage medium, which can transmit video data through a wireless screen sharing device without video decoding capability, and enable conferencing software of a client device to play the video data transmitted by the wireless transmitter normally.

According to a first aspect of the present disclosure, a video transmission method is provided, being applied to a wireless screen sharing device including a universal interface, where the wireless screen sharing device does not have video decoding capability, the wireless screen sharing device is used to be connected to a screen sharing receiving device, and the screen sharing receiving device is connected to a camera head to receive original video data transmitted by the camera head; the method includes:

connecting with the client device through the universal interface and identifying whether the client device is running a decoding application, where the client device is installed with conferencing software;

configuring the universal interface to create a camera peripheral device;

when it is recognized that the client device is running a decoding application, transmitting first notification information to the screen sharing receiving device, where the first notification information is used to instruct the screen sharing receiving device to encode the received original video data based on the first notification information to obtain video data in a first data format;

receiving video data in the first data format and transmitting the video data in the first data format to the decoding application, where the decoding application is used to process the received video data in the first data format based on the data format supported by the client device for playback to acquire video data in a second data format;

receiving video data in the second data format and presenting the video data in the second data format to the conferencing software through the camera peripheral device;

when it is recognized that the client device is not running the decoding application, transmitting second notification information to the screen sharing receiving device, where the second notification information is used to notify the screen sharing receiving device to process the received original video data based on the data format supported by the client device for playback to acquire video data in a third data format; and receiving video data in the third data format through the camera peripheral device, and transmitting the video data in the third data format to the conferencing software through the camera peripheral device.

According to a second aspect of the present disclosure, a conferencing system is provided, including an interactive board and a wireless screen sharing device, where the interactive board includes interconnected camera heads and a screen sharing receiving device, and the camera head is used to collect original video data; the screen sharing receiving device is used to transmit the original video data collected by the camera head for transmission;

the wireless screen sharing device is connected to a client device, and the client device is installed with conferencing software;

the wireless screen sharing device creates a camera peripheral device, and the camera peripheral device corresponds to the camera head;

when the wireless screen sharing device recognizes that the client device is running a decoding application, the wireless screen sharing device transmits first notification information to the screen transmission receiver;

the screen sharing receiving device encodes the received original video data based on the first notification information to obtain the first data format video data;

the screen sharing receiving device transmits the video data in the first data format to the wireless screen sharing device;

the wireless screen sharing device transmits the received video data in the first data format to the decoding application, where the decoding application is used to process the received video data in the first data format based on the data format supported by the client device for playback to obtain the video data in the second data format;

the wireless screen sharing device receives video data in the second data format and presents it to the conferencing software through the camera peripheral device;

when the wireless screen sharing device recognizes that the client device is not running the decoding application, the wireless screen sharing device transmits second notification information to the screen transmission receiver;

based on the second notification information, the screen sharing receiving device processes the received original video data based on the data format supported by the client device for playback to acquire video data in a third data format, and transmits the video data in the third data format to the wireless screen sharing device;

the wireless screen sharing device receives the video data in the second data format and presents it to the conferencing software through the camera peripheral device.

According to a third aspect of the present disclosure, a storage medium including computer executable instructions is provided, where the computer executable instructions are used to execute a video data transmission method as described in the aforementioned embodiment when executed by a computer processor.

According to the embodiment of the present disclosure, the wireless screen sharing device does not have video decoding capability, forwards the compressed and encoded the received video data in the first data format to the client device, to trigger the decoding application of the client device to decode the video data in the first data format to obtain the video data in the second data format, and transmits the video data in the second data format to the wireless screen sharing device. The wireless screen sharing device presents the video data in the second data format to the camera peripheral device. When it recognizes that the decoding application of the client device is not running, the wireless screen sharing device triggers the screen sharing device receiver to process the received original video data in the data format supported by the client device for playback to obtain the video data in the third format, and transmits the video data in the third data format to the wireless screen sharing device. The wireless screen sharing device presents the received video data in the third data format to the camera peripheral device, so that the conferencing software of the client device can play the video data in the second or third data format normally.

DESCRIPTION OF THE PREFERRED EMBODIMENTS

Figure 1:
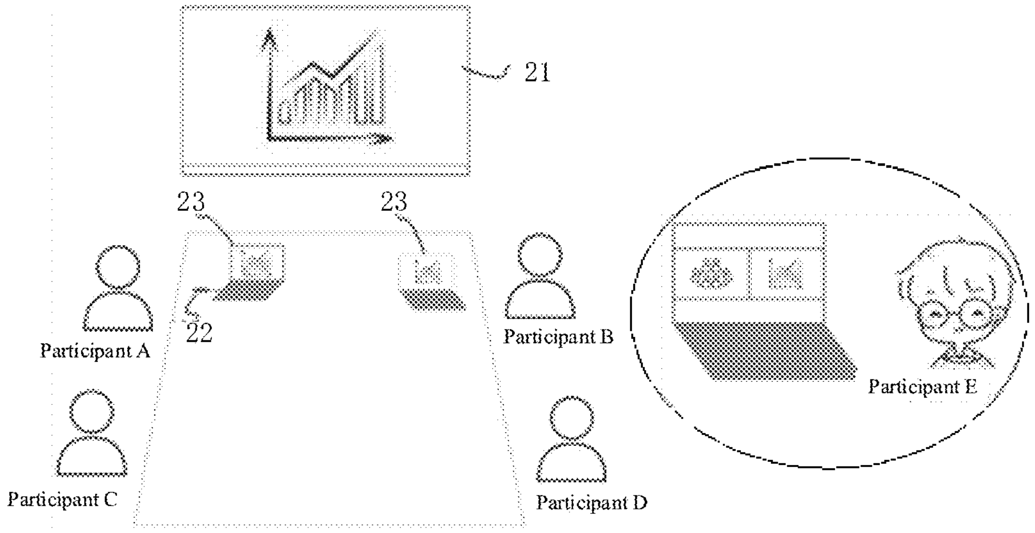
FIG. 1 is an application scenario diagram of a video data transmission method according to an embodiment of the present disclosure.

In order to make the purpose, technical solution, and advantages of the present disclosure clearer, further detailed descriptions of specific embodiments of the present disclosure will be provided below in conjunction with the accompanying drawings. It may be understood that the specific embodiments described here are only intended to explain the present disclosure and not to limit it. Furthermore, it should be noted that for ease of description, only the relevant parts of the present disclosure are shown in the accompanying drawings, rather than the entire content. Before discussing the exemplary embodiments in more detail, it should be mentioned that some exemplary embodiments are described as processes or methods depicted as flowcharts. Although flowcharts describe various operations (or steps) as sequential processing, many of them may be implemented in parallel, concurrently, or simultaneously. In addition, the order of each operation may be rearranged. When the operation is completed, the process may be terminated, but there may also be additional steps not included in the drawings. The processing may correspond to methods, functions, procedures, subroutines, subroutines, etc.

Firstly, in order to better understand a video data transmission method according to an embodiment of the present disclosure, the present disclosure scenarios of the embodiments of the present disclosure will be introduced in conjunction with FIG. 1.

In multi-person interaction scenarios such as meetings, teaching, discussions, and brainstorming, with the rapid development of information technology, the limitations of traditional communication methods mainly based on offline listening and watching are becoming increasingly apparent. Online multi-person communication, such as remote meetings, remote education, and online chatting, has become a trend of the times. Taking remote meetings as an example, in the prior art, users usually install remote conferencing software (such as Zoom, TEAMS, Tencent Meeting, Mailing, etc.) on client devices (such as computers, phones, tablets, etc.) and hold meetings with other online users through remote meeting software. During the meeting, a camera head on the computer is usually used to share their own images with online users. However, the quality of the built-in camera head on the computer of a user is usually relatively low, and it usually may not meet the needs of high-quality meetings.

In related technologies, users may physically plug a wireless screen sharing device into a universal interface of the computer (such as a USB interface), and establish a data transmission link between the wireless screen sharing device and the screen transmission receiver. Based on this data transmission link, the computer may call the camera head connected to the screen transmission receiver through a wireless screen sharing device, thereby achieving the use of the camera head connected to the screen sharing receiving device for meetings. Taking the interactive board as an example, as shown in FIG. 1, the user (participant) may use a wireless screen sharing device 22 to create a video device on a computer 23, and use this video device to call a camera head outside of the computer 23 for remote meetings to meet the needs of high-quality meetings. For example, the interactive board 21 may be integrated with a screen sharing receiving device, which may be integrated into the interactive board 21 for meetings in hardware or software. The computer 23 may be connected to the screen sharing receiving device through a screen sharing device to call the camera head of the interactive board 21 and use the camera head of the interactive board 21 for meetings. In this scenario, the interactive board 21 usually compresses and encodes the original video stream collected by the camera head of the interactive board 21 to obtain the compressed and encoded video stream, and transmits the compressed and encoded video stream to the wireless screen sharing device 22.

In related technologies, some wireless screen sharing devices have video decoding capabilities. After receiving the compressed and encoded video stream transmitted by the screen sharing receiving device of the interactive board, these wireless screen sharing devices may decode the received compressed and encoded video stream to decode it into a video stream in a data format supported by the conferencing software for playback, and transmit the decoded video stream to the computer. This way, the computer may present the decoded video stream to the conferencing software. The conferencing software may use a camera head to hold meetings with remote attendees, enabling users to call the camera head of the interactive board for meetings. But some wireless screen sharing devices do not have video decoding capabilities. At this time, after receiving the compressed and encoded video stream transmitted by the interactive board, the wireless screen sharing device may not decode it, which may cause the conferencing software on the computer to be unable to play the compressed and encoded video stream normally.

Moreover, the amount of data collected by the camera head from the original video stream is generally large. For example, for YUV format video streams with a resolution of 1080P, in order to transmit 30 frames of YUV format video stream, a transmission rate of about 700 Mbps per second is required to ensure its transmission effect. However, current wireless communication networks may not meet such fast transmission rates. Therefore, based on the actual wireless communication environment, it is not possible to directly transmit the original video stream to the wireless screen sharing device.

Based on the above issues, the inventors proposed a conferencing system that can enable video streams transmitted by wireless transceivers without video decoding capabilities to be played normally in computer conferencing software.

Figure 2:
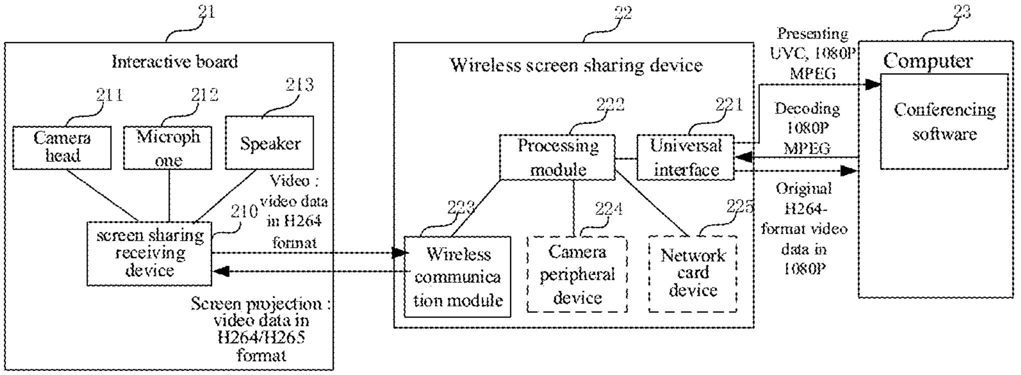
FIG. 2 is a first architecture diagram of a conferencing system according to an embodiment of the present disclosure.

As shown in FIG. 2, according to the embodiment of the present disclosure, a conferencing system 20 includes an interactive board 21 and a wireless screen sharing device 22. The interactive board 21 may include a screen sharing receiving device 210, a camera head 211, a microphone 212, and a speaker 213. The camera head 211, the microphone 212, and the speaker 213 may be integrated into the interactive board 21 as a whole. In other embodiments, the camera head 211, the microphone 212, and the speaker 213 may be separately or partially independent of the external components of the interactive board and physically connected to the interactive board. The screen sharing receiving device 210 may be implemented through software and/or hardware.

The screen sharing receiving device 210 is used to establish a wireless communication link with the screen transmission transmitting end, such as the wireless screen sharing device 22, and transmit video data through the wireless communication link. The camera head 211 is used to collect original video data of a location of the interactive board 21 (such as a conference room), and the microphone 212 is used to collect original video data of a location of the interactive board 21 (such as a conference room). The speaker 213 may play the received video data.

In other embodiments, the screen sharing receiving device 210 may be independent of the external environment of the interactive board 21, When the screen sharing receiving device 210 is independent of the external interactive board 21, the screen sharing receiving device 210 may be integrated with the camera head 211, such as an integrated video conference terminal, and the integrated video conference terminal may integrate a camera head, a microphone, a speaker, and a cloud video conference terminal into one.

In some other embodiments, when the screen sharing receiving device 210 is independent of the external environment of the interactive board 21, the screen sharing receiving device 210 may be independent of the camera head 211. For example, the screen sharing receiving device 210 may be a screen transmission box, and the camera head 211 may be connected to the screen transmission box through a connecting cable. The screen transmission box may be connected to the interactive board 21 in a wired or wireless manner. In other embodiments, the camera head 211 may be integrated inside the interactive board, and the screen transfer box may be connected to the interactive board 21 in a wired or wireless manner.

As shown in FIG. 2, the interactive board 21 may process the original video data of the conference room collected by the camera head 211 and transmit the processed video data to the wireless screen sharing device 22. For example, the interactive board 21 may compress and encode the original video data to obtain the compressed video data, and transmit the compressed video data to the wireless screen sharing device 22. For example, the original video data collected by the camera head 211 is video data in YUV (also known as Y'UV, YUV, YCbCr, and YPbPr) format, and the interactive board 21 may compress and encode video data in YUV format into video data in H264 format, and transmit the video data in H264 format to the wireless screen sharing device 22.

In the embodiment of the present disclosure, the wireless screen sharing device 22 includes a universal interface 221, a processing module 222, and a wireless communication module 223. The universal interface 221 and the wireless communication module 223 are respectively connected to the processing module 222.

The universal interface 221 provides specific one or more ports to achieve wired connection with the computer 23 through specific ports. The type of the universal interface 221 is currently not limited, for example, the universal interface 221 may be Universal Serial Bus (USB) port or High Definition Multimedia Interface (HDMI), etc., in one embodiment, taking the universal interface 221 as USB port as an example, the wireless screen sharing device 22 and computer 23 are connected via USB cable. Optional, when connected via USB cable, the wireless screen sharing device 22 is equipped with a USB port plug, and the computer 23 is equipped with a USB port socket. After the universal interface 221 is inserted into the computer 23, the wireless screen sharing device 22 may work. The specific implementation approaches of the computer 23 detecting the wireless screen sharing device 22 and signal transmission with wireless screen sharing device 22 are currently not limited. It may be understood that in practical applications, the universal interface 221 of the wireless screen sharing device 22 may also be connected to the computer 23 through a connecting cable, the two ends of the connecting cable may be connected to the universal interface 221 and the computer 23 respectively.

The processing module 222 may include a Micro controller Unit (MCU) or System on Chip (SoC), etc. In one embodiment, the processing module 222 includes a storage portion and a processing portion, the storage portion may be integrated into one physical entity or may be different physical entities. The storage portion and the processing portion may be understood as memory and processor, respectively. The components and circuit structure contained in the storage portion and processing portion are currently not limited. The storage section may cache the currently processed data (such as screen data), and may also store the computer programs required during the operation of the wireless screen sharing device. The processing portion includes one or more processors, and the processing portion may run computer programs stored in the storage portion to achieve the various functions of the wireless screen sharing device 22. On this basis, the data transmission between computer 23, the interactive board 21, and wireless screen sharing device 22 requires the processing module 222.

The processing module 222 according to the embodiment of the present disclosure does not have video decoding capability and does not support decoding processing of compressed encoded video data. It may be understood that the processing module 222 according to the embodiment of the present disclosure does not have a video decoder, the processing module 222 may not support software decoding or hardware decoding of videos. The video decoder may be implemented through software or hardware, and the video decoder may perform restoration and decoding operations on encoded video data.

The wireless communication module 223 has both transmission and reception functions, and the wireless communication module 223 is used for transmitting data and instructions (i.e. transmitting signals) with the interactive board 21. It may be understood that the wireless screen sharing device 22 and the interactive board 21 establish a wireless connection, specifically referring to the wireless communication module 223 establishing a wireless connection with the interactive board 21. The connection protocol used for wireless connection is currently not limited. In one embodiment, the wireless communication module 223 may include a Wi-Fi module and/or a Bluetooth module, the wireless communication module 223 establishes a wireless connection within the local area network with the interactive board 21 through the Wi-Fi module, and establishes a Bluetooth connection with the interactive board 21 through the Bluetooth module. Optionally, the wireless communication module 223 further includes Near Field Communication (NFC) module to achieve near-field communication with the interactive board 21. For example, the wireless screen sharing device 22 acquires a communication address of the interactive board 21 in the local area network through the NFC module, and then establishes a wireless connection with the interactive board 21 through the NFC module based on the communication address.

According to the embodiment of the present disclosure, when the user inserts the wireless screen sharing device 22 into the USB interface of the computer 23, it will trigger the pre-installed driver to run on the computer 23, so that the computer 23 may communicate with the wireless screen sharing device 22. On this basis, in order to achieve recognition of the video stream transmitted by the wireless screen sharing device 22 by the conferencing software running on computer 23, the wireless screen sharing device 22 will initiate a peripheral creation request to the computer through the corresponding driver (such as a camera head driver) to create a camera peripheral device 224 corresponding to the camera head 211 on the wireless screen sharing device 22.

For example, the computer 23 may acquire USB description message of the wireless screen sharing device 22 based on an enumeration process of the USB interface, use the USB description message as identification information; based on the preset driver of the identification information matching system, run the matched driver to create a camera peripheral device 224 corresponding to the camera head 211 on the wireless screen sharing device 22.

The device created by the wireless screen sharing device 22 on the computer 23 is a standard UVC device (USB video class device). When the wireless screen sharing device 22 is inserted into the computer, the wireless screen sharing device 22 will transmit a USB description message to the computer 23 to indicate its identity. During the enumeration process, the computer 23 transmits a Get Device Descriptor request to the wireless screen sharing device 22 to acquire a maximum packet length of the default control pipeline, and then transmits a request Set Address to assign a unique device address to the wireless screen sharing device 22. By repeatedly transmitting a Get Device Descriptor request to the wireless screen sharing device 22, complete configuration information (configuration descriptor, interface descriptor, endpoint descriptor, setting definition descriptor, application custom descriptor, etc.) is acquired to obtain the USB description message of the wireless screen sharing device and its identification information is determined. Furthermore, based on this identification information, the pre-installed driver on the computer system is located, and the driver matches the identification information. By running the driver, a UVC device (USB video class device) corresponding to the camera head 211 may be created on the wireless screen sharing device 22.

It should be noted that the number of camera heads 211 according to the embodiment of the present disclosure may be one or more. When there is one camera head 211, the wireless screen sharing device 211 may create a camera peripheral device corresponding to the camera head 211. When there are multiple camera heads 211, the wireless screen sharing device 211 may create a camera peripheral device corresponding to multiple camera heads 211. Alternatively, when there are multiple camera heads 211, the wireless screen sharing device may create multiple camera peripheral devices, each corresponding to a camera head. Alternatively, when there are multiple camera heads 211, the wireless screen sharing device may create multiple camera peripheral devices. The number of camera peripheral devices may be greater than or less than the number of camera heads, and the correspondence between camera peripheral devices may be set based on actual conditions. For example, one camera head may correspond to one camera peripheral devices, while multiple camera heads may correspond to one camera peripheral devices.

As shown in FIG. 2, according to the embodiment of the present disclosure, in order to achieve data transmission between the wireless screen sharing device 22 and the computer 23, the wireless screen sharing device 22 will initiate a peripheral creation request to the computer through a corresponding driver (such as a network card driver) to create a network card device 225 on the wireless screen sharing device 22. The network card driver is used to create a universal interface-based network card device 225 on the wireless screen sharing device 22, and the universal interface-based network card device 225 transmits data to or receives data from the computer 23 in the form of network packets through the universal interface 221. Due to the high data transmission bandwidth supported by the network card device 225, data transmission through the network card device 225 can increase the data transmission bandwidth, making the wireless screen sharing device 22 transmit content to the computer 23 at a faster rate.

In the embodiment of the present disclosure, when the wireless screen sharing device 22 is connected to the computer 23 through the universal interface 221, the processing module 222 may monitor the running of the decoding application of the computer 23. The decoding application may decode the video data received by computer 23 to obtain the corresponding format of video data.

As shown in FIG. 2, when the conferencing software of the computer 23 selects the camera peripheral device 224 created by the wireless screen sharing device 22 for the conference, the processing module 222 may transmit a first notification information to the interactive board 21 when monitoring the decoding application of the computer 23. The first notification information is used to instruct the interactive board 21 to process the received original video data based on the first notification information to obtain video data in the first data format. The data amount of the video data in the first data format is smaller than that of the original video data. After receiving the first notification information, the interactive board 21 may compress and encode the original video data of the conference room collected by the camera head 211 to obtain the video data in the first data format, and transmit the video data in the first data format to the wireless communication module 223 of the wireless screen sharing device 22. The processing module 222 controls the wireless communication module 223 to transmit the video data in the first data format to the network card device 225, and the network card device 225 transmits the video data in the first data format to the computer 23 through the universal interface 221. After receiving the video data in the first data format, the computer 23 may decode and process it using the decoding application running on it based on the data format supported by the computer 23 for playback to obtain the video data in the second data format, and then transmit the video data in the second data format to network card device 225, the amount of video data in the second data format is greater than that in the first data format. After receiving the video in the second data format, the network card device 225 presents it to the camera peripheral device 224, so that the conferencing software of the computer 23 may present the video data captured by the camera head 211 of the interactive board 21 to the attendees.

For example, the video data in the first data format may be video data in H264/H265 format, and the video data in the second data format may be video data in MJPEG format or video data in YUV format. It may be understood that the above is only an exemplary explanation, and the video data in the first data format may be specifically determined based on the actual situation of the interactive board 21 and the transmission capacity of the wireless network between the interactive board 21 and the wireless screen sharing device 22. The video data in the second data format may be determined based on the actual supported data format of the conferencing software on computer 23. For example, when the conferencing software on the computer 23 only supports video data in YUV format, the decoding application may decode it into video data in YUV format.

According to the embodiment of the present disclosure of the present disclosure, the wireless screen sharing device does not have video decoding capability, the wireless screen sharing device forwards the received compressed and encoded video data in the first data format to the computer to trigger the decoding application of the computer to decode and process the video data in the first data format to obtain the video data in the second data format, and transmits the video data in the second data format to the wireless screen sharing device. The wireless screen sharing device presents the received video data in the second data format to the camera peripheral device, allowing the conferencing software on the computer 23 to play the video data in the second data format normally.

In some embodiments, the wireless screen sharing device 22 may be pre-installed with a monitoring application, and the monitoring application may monitor the running of the decoding application on the computer 23. The monitoring application may be pre-stored in the memory of the wireless screen sharing device 22, and the processing module 222 may monitor the running of the decoding application of the computer 23 by calling and executing the monitoring application.

In other embodiments, the camera head driver and/or network card driver may also be customized by the supplier. In some scenarios where video transmission privacy is limited, in order to restrict unrelated devices from acquiring the audio and video streams transmitted by the system, the driver customized by a supplier may be used to create the camera head driver and/or network card driver.

Wireless screen sharing devices in related technologies have small volumes, and wireless screen sharing devices with video decoding capabilities have limited computing power. In cases where their device capabilities are limited, they may usually only support presenting video data with lower fixed resolution to computers. For example, it only supports providing 720p video data to the computer, and when the computer has high performance for supporting to play video data with high resolution (such as 1080p or 4K), the playback effect of video data with lower fixed resolution on the computer is not good.

Based on this, in some embodiments, the processing module 222 may also acquire the maximum resolution of video data supported by the computer 23 through the universal interface 221, and form a first notification information based on the maximum resolution. The first notification information is used to instruct the interactive board 21 to process the original video data of the conference room collected by the camera head 211 based on the maximum resolution to obtain the video data in the first data format with the maximum resolution. The processing module 222 is also configured to transmit the first notification information to the interactive board 21. After receiving the first notification information, the interactive board 21 processes the original video data of the conference room collected by the camera head 211 based on the maximum resolution to obtain the video data in the first data format with the maximum resolution, and transmits the video data in the first data format with the maximum resolution to the wireless screen 22. The wireless screen sharing device 22 transmits the video data in the first data format with the maximum resolution to the computer 23. The computer 23 decodes and processes it through a decoding application to obtain the video data in the second data format with the maximum resolution, and transmits it back to the wireless screen sharing device 22. The wireless screen sharing device 22 presents the video data in the second data format with the maximum resolution to the conferencing software of the computer 23 through the camera peripheral device 224, so that the conferencing software of the computer 23 may play the video data in the second data format with the maximum resolution.

For example, the maximum resolution supported by computer 23 is 1080p. The processing module 222 may also acquire the maximum resolution of video data supported by the computer 23 for playback through the universal interface 221, and form first notification information based on the maximum resolution of 1080p. The first notification information is used to instruct interactive board 21 to process the original video data collected by the camera head 211 in the conference room based on the maximum resolution of 1080p to obtain H264-format video data in 1080p. The processing module 222 is also configured to transmit the first notification information to the interactive board 21. After receiving the first notification information, the interactive board 21 processes the original video data of the conference room collected by the camera head 211 based on 1080p to obtain H264-format video data in 1080p, and transmits the H264-format video data in 1080p to the wireless screen sharing device 22. The wireless screen sharing device 22 transmits H264-format video data in 1080p to the computer 23, and the computer 23 decodes it through a decoding application to obtain MJPEG-format video data in 1080p and transmits it back to the wireless screen sharing device 22. The wireless screen sharing device 22 presents MJPEG-format video data in 1080p to conferencing software of the computer 23 through the camera peripheral device 224, so that the conferencing software of the computer 23 may play MJPEG-format video data in 1080p.

For example, the maximum resolution supported by the computer 23 is 720p, and the processing module 222 may also acquire the maximum resolution of video data supported by the computer 23 for playback through the universal interface 221, based on the maximum resolution of 720p, forms a first notification information. The first notification information is used to instruct interactive board 21 to process the original video data of the conference room collected by the camera head 211 based on the maximum resolution of 720p to obtain H264-format video data in 720p. The processing module 222 is further configured to transmit the first notification information to the interactive board 21. After receiving the first notification information, the interactive board 21 processes the original video data of the conference room collected by the camera head 211 based on 720p to obtain H264-format video data in 720p, and transmits the H264 format video data in 720p to the wireless screen 22. The wireless screen sharing device 22 transmits H264-format video data in 720p to the computer 23, and the computer 23 decodes it through a decoding application to obtain MJPEG-format video data in 720p and transmits it back to wireless screen sharing device 22. The wireless screen sharing device 22 presents MJPEG-format video data in 720p to the conferencing software of the computer 23 through the camera peripheral device 224, so that the conferencing software of the computer 23 may play MJPEG-format video data in 720p.

According to the embodiment of the present disclosure, it may be understood that the encoding manner of the original video data may be adjust by triggering the interactive tablet 21 through the wireless screen sharing device based on the maximum resolution video data supported by the computer, so that the wireless screen sharing device can present the video data in the second data format to the conferencing software based on the maximum resolution supported by the computer.

In one embodiment, when wireless screen sharing device 22 is first connected to the computer 23, extract the decoding application stored in wireless screen sharing device 22 and install it locally on the computer 23, or download the installation package of the decoding application based on the decoding application pre-stored in wireless screen sharing device 22, and install the decoding application locally on computer 23 based on the installation package.

It may be understood that in order to facilitate the configuration of the corresponding decoding application by the client device, according to the embodiment of the present disclosure, the decoding application is installed when the screen sharing device is first connected to the computer 23 for subsequent video data decoding. Therefore, by storing the installation package of the decoding application or download address of the decoding application in the wireless screen sharing device 22, when connecting with computer 23 for the first time, the installation package of the decoding application or download address of the decoding application is provided to the computer 23. The computer 23 installs the decoding application based on the installation package of the decoding application or connects to the network to download and install the decoding application based on the download address of the decoding application, thereby providing the decoding ability of responding the computer 23, allowing the computer 23 to decode the video data transmitted by the wireless screen sharing device 22. In practical applications, the decoding application may also be actively sent from the system background of the conferencing software to the computer 23 for installation. According to the embodiment of the present disclosure, the specific decoding application installation scheme is currently not limited, which will not be described herein.

Figure 3:
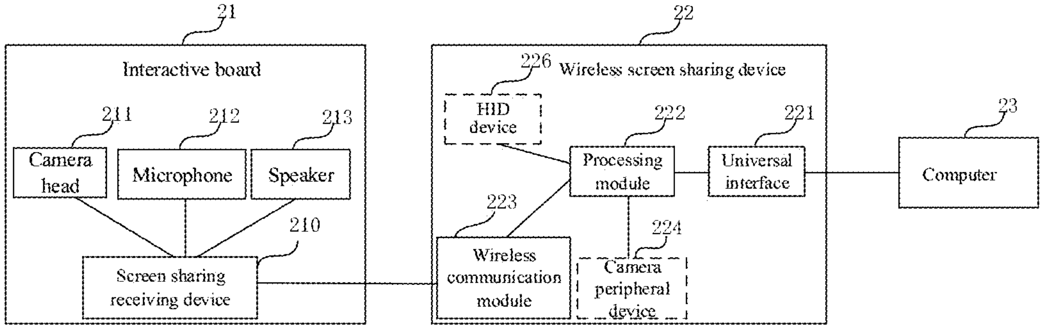
FIG. 3 is a second architecture diagram of a conferencing system according to an embodiment of the present disclosure.

As shown in FIG. 3, FIG. 3 is a second architecture diagram of a conferencing system according to the embodiment of the present disclosure. Unlike the above embodiments, the wireless screen sharing device 22 initiate a peripheral creation request to the computer through the HID (Human Interface Device) driver to create an HID device 226 on the wireless screen sharing device 22. The HID driver is used to create a HID device 226 based on a universal interface on the wireless screen sharing device 22. The HID device 226 transmits data to or receives data from the computer 23 in the form of HID packets through the universal interface 221. The rest are the same as the above embodiments and will not be repeated here.

However, in practical applications, due to security limitations, some computers may not be able to install the decoding application in the above embodiments, or may not be able to run the decoding application properly, resulting in the conferencing software on the computer 23 being unable to play video data properly.

Based on this, the processing module 222 according to the embodiment of the present disclosure may also form a second notification information when monitoring that the computer 23 is not running the decoding application, and transmit the second notification information to the interactive board 21. The second notification information is used to instruct the interactive board 22 to directly compress and encode the original video data collected by the camera head 211 in the conference room into a third data format supported by the computer 23 for playback. The interactive board 21 transmits video data in the third data format to the wireless communication module 223 of the wireless screen sharing device 23. The processing module 222 controls the wireless communication module 223 to forward the received video data in the third data format to the camera peripheral device 224, so that the camera peripheral device 224 presents the video data in the third data format to the conferencing software of the computer 23. For example, computer 23 may support playing MJPEG-format video data, and the interactive board 22 may directly compress and encode the original video data collected by the camera head 211 in the conference room into MJPEG-format video data. When the computer 23 may support multiple video formats for playback, the smallest data format may be selected for compression encoding. For example, the computer 23 may support playing MJPEG-format video data or YUV-format video data, the data amount of YUV-format video data is greater than that of MJPEG-format video data. In order to improve the transmission rate of video data between interactive boards and wireless screen sharing devices, the original video data may be encoded into MJPEG-format video data.

In some embodiments, the processing module 222 may further acquire the maximum resolution of video data supported by the computer 23 for playback through the universal interface 221, and form a second notification information based on the maximum resolution. The second notification information is used to instruct the interactive board 21 to process the original video data of the conference room collected by the camera head 211 based on the maximum resolution to obtain the video data in the second data format with the maximum resolution. The processing module 222 is further configured to transmit the second notification information to the interactive board 21. After receiving the second notification information, the interactive board 21 processes the original video data of the conference room collected by the camera head 211 based on the maximum resolution to obtain the video data in the second data format with the maximum resolution, and transmits the video data in the second data format with the maximum resolution to the wireless screen sharing device 22. The wireless screen sharing device 22 presents the video data in the second data format with maximum resolution to the conferencing software of the computer 23 through the camera peripheral device 224, so that the conferencing software of the computer 23 may play the video data in the second data format with maximum resolution.

For example, the maximum resolution supported by computer 23 is 1080p. The processing module 222 may also acquire the maximum resolution of video data supported by the computer 23 for playback through the universal interface 221, and form second notification information based on the maximum resolution of 1080p. The second notification information is used to instruct the interactive board 21 to process the original video data collected by the camera head 211 in the conference room based on the maximum resolution of 1080p to obtain MJPEG-format video data in 1080p. The processing module 222 is further configured to transmit the second notification information to the interactive board 21. After receiving the second notification information, the interactive board 21 processes the original video data of the conference room collected by the camera head 211 based on 1080p to obtain MJPEG-format video data in 1080p, and transmits the MJPEG-format video data in 1080p to the wireless screen sharing device 22. The wireless screen sharing device 22 presents MJPEG-format video data in 1080p to the conferencing software of the computer 23 through the camera peripheral device 224, so that the conferencing software of the computer 23 may play MJPEG-format video data in 1080p.

For example, the maximum resolution supported by the computer 23 is 720p, and the processing module 222 may also acquire the maximum resolution of video data supported by the computer 23 for playback through the universal interface 221, based on the maximum resolution of 720p, form a second notification information, the second notification information is used to instruct interactive board 21 to process the original video data of the conference room collected by the camera head 211 based on the maximum resolution of 720p to obtain MJPEG-format video data in 720p, and transmit MJPEG-format video data in 1080p to the wireless screen sharing device 22. The wireless screen sharing device 22 presents MJPEG-format video data in 720p to the conferencing software of the computer 23 through the camera peripheral device 224, so that the conferencing software of the computer 23 may play MJPEG-format video data in 720p.

Figure 4:
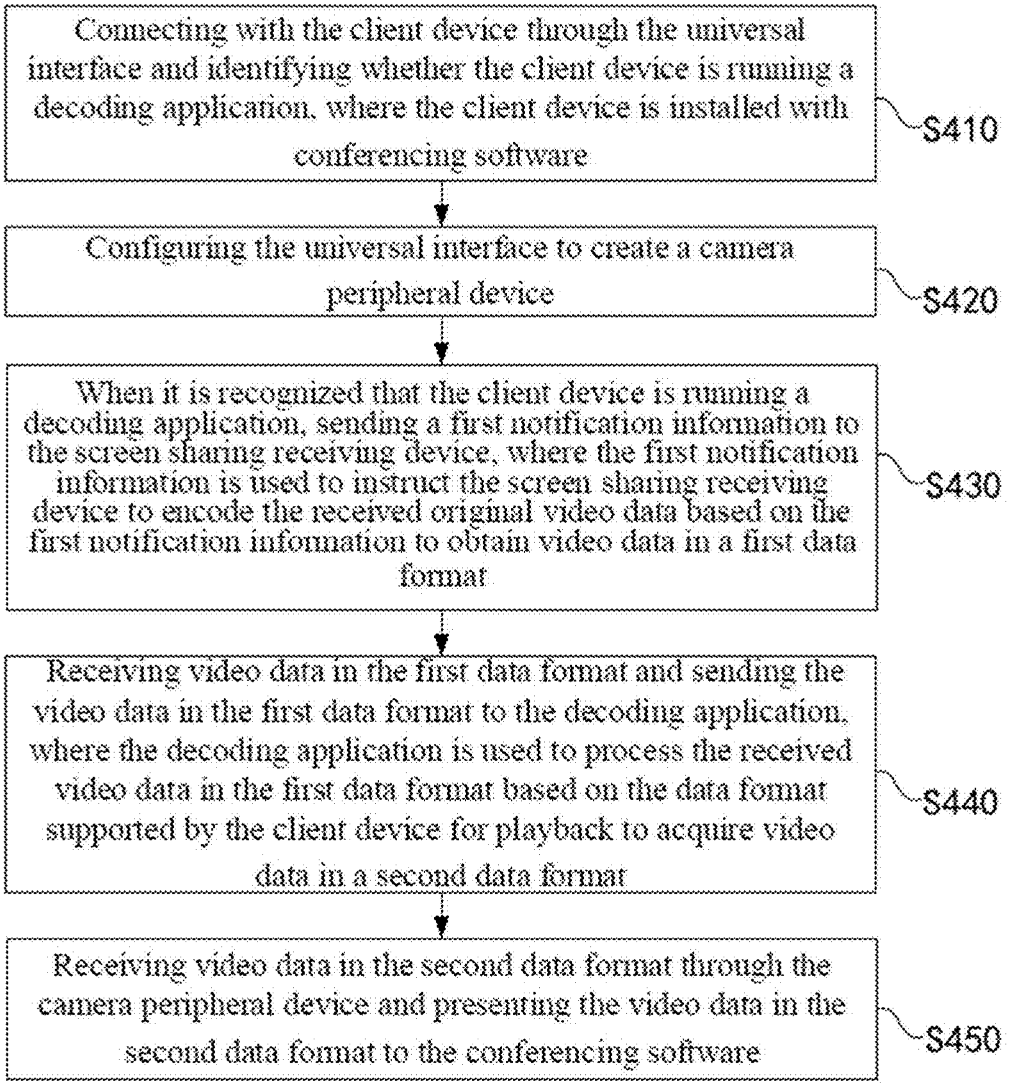
FIG. 4 shows a first flowchart of a video data transmission method according to an embodiment of the present disclosure.

As shown in FIG. 4, FIG. 4 shows a first flowchart of a video data transmission method according to an embodiment of the present disclosure. The video data transmission method according to this embodiment may be executed by a wireless screen sharing device in any of the above embodiments. The wireless screen sharing device in any of the above embodiments is described as the main body of executing the video data transmission method. Referring to FIG. 4, the video data transmission method specifically includes:

S410, connecting with the client device through the universal interface and identifying whether the client device is running a decoding application, where the client device is installed with conferencing software.

S420, configuring the universal interface to create a camera peripheral device.

S430, when it is recognized that the client device is running a decoding application, transmitting a first notification information to the screen sharing receiving device, where the first notification information is used to instruct the screen sharing receiving device to encode the received original video data based on the first notification information to obtain video data in a first data format.

S440, receiving video data in the first data format and transmitting the video data in the first data format to the decoding application, where the decoding application is used to process the received video data in the first data format based on the data format supported by the client device for playback to acquire video data in a second data format.

S450, receiving video data in the second data format through the camera peripheral device and presenting the video data in the second data format to the conferencing software.

Figure 5:
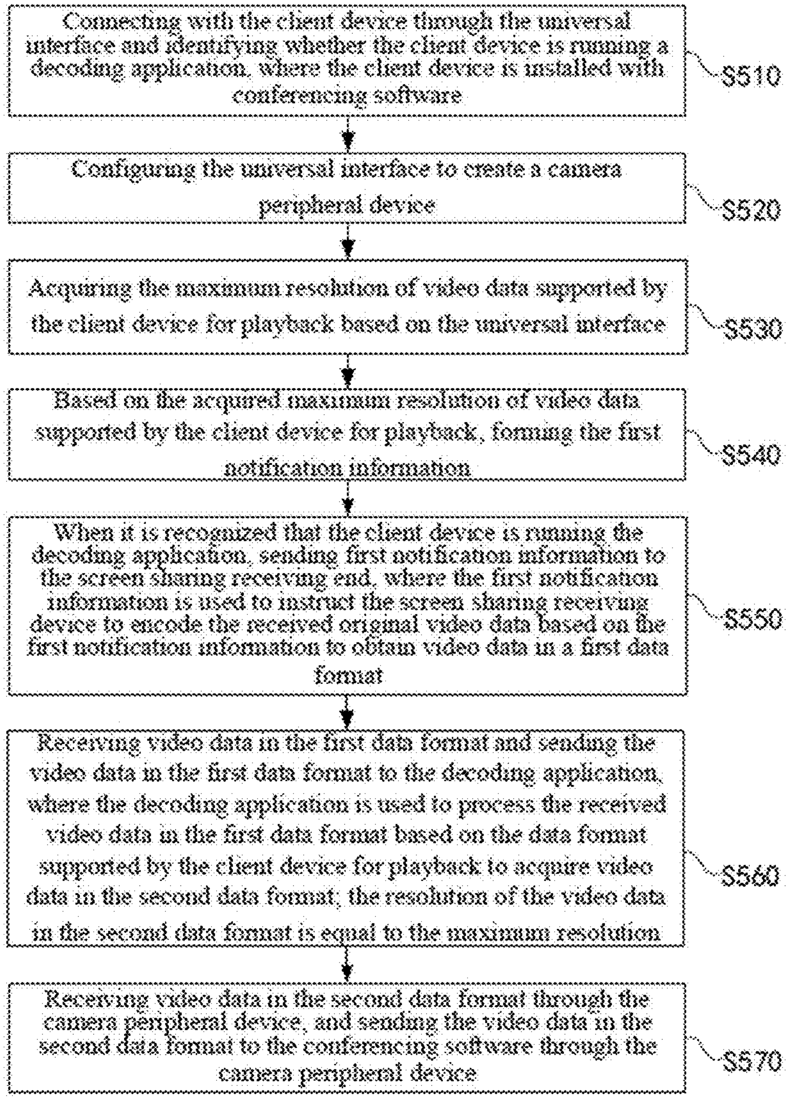
FIG. 5 shows a second flowchart of a video data transmission method according to an embodiment of the present disclosure.

As shown in FIG. 5, FIG. 5 shows a second flowchart of a video data transmission method according to an embodiment of the present disclosure, and the video data transmission method specifically includes:

S510, connecting with the client device through the universal interface and identifying whether the client device is running a decoding application, where the client device is installed with conferencing software.

S520, configuring the universal interface to create a camera peripheral device.

S530, acquiring the maximum resolution of video data supported by the client device for playback based on the universal interface.

S540, based on the acquired maximum resolution of video data supported by the client device for playback, forming the first notification information.

S550, when it is recognized that the client device is running the decoding application, transmitting first notification information to the screen sharing receiving device, where the first notification information is used to instruct the screen sharing receiving device to encode the received original video data based on the first notification information to obtain video data in a first data format.

For example, when it is recognized that the client device is running the decoding application, a first notification information is sent to the screen sharing receiving device. The first notification information is used to instruct the screen sharing receiving device to compress and encode the received original video data based on the maximum resolution to obtain video data in the first data format, and the resolution of the video data in the first data format is equal to the maximum resolution.

S560, receiving video data in the first data format and transmitting the video data in the first data format to the decoding application, where the decoding application is used to process the received video data in the first data format based on the data format supported by the client device for playback to acquire video data in the second data format; the resolution of the video data in the second data format is equal to the maximum resolution.

S570, receiving video data in the second data format through the camera peripheral device, and transmitting the video data in the second data format to the conferencing software through the camera peripheral device.

Figure 6:
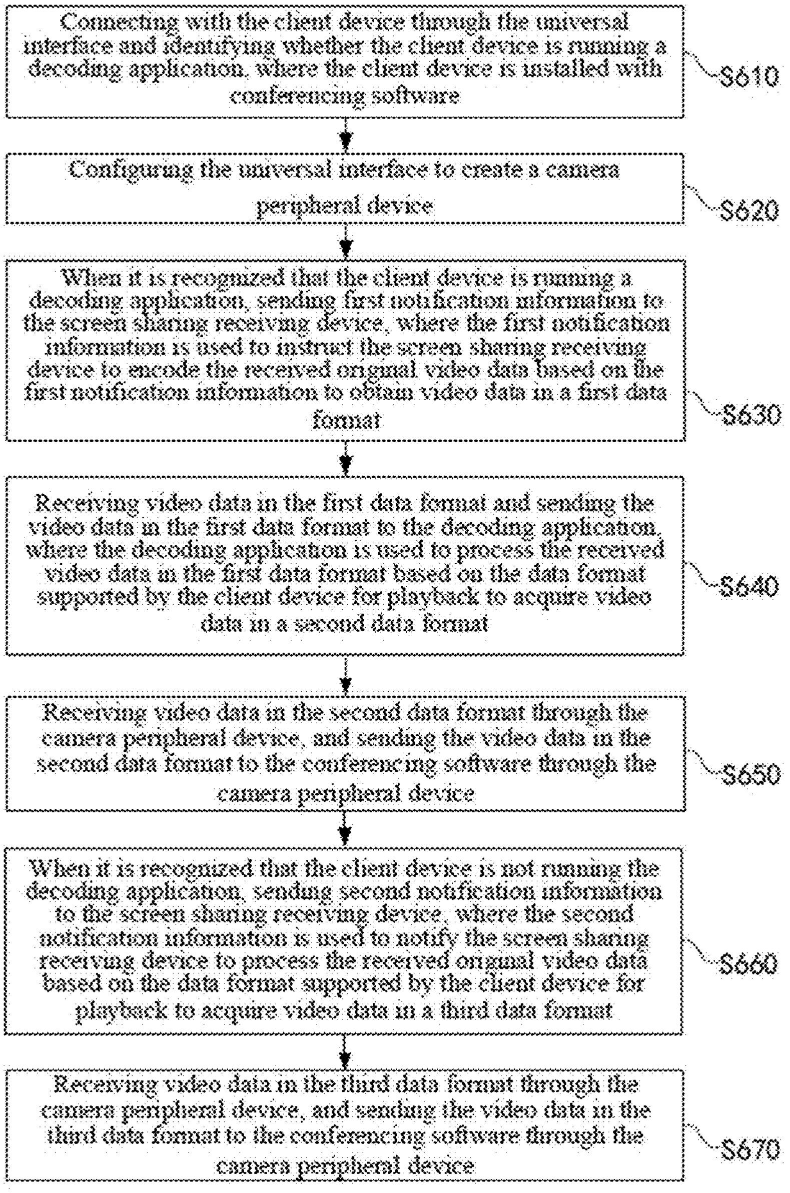
FIG. 6 shows a third flowchart of a video data transmission method according to an embodiment of the present disclosure.

As shown in FIG. 6, FIG. 6 shows a third flowchart of a video data transmission method according to an embodiment of the present disclosure, the video data transmission method specifically includes:

S610, connecting with the client device through the universal interface and identifying whether the client device is running a decoding application, where the client device is installed with conferencing software.

S620, configuring the universal interface to create a camera peripheral device.

S630, when it is recognized that the client device is running a decoding application, transmitting first notification information to the screen sharing receiving device, where the first notification information is used to instruct the screen sharing receiving device to encode the received original video data based on the first notification information to obtain video data in a first data format.

S640, receiving video data in the first data format and transmitting the video data in the first data format to the decoding application, where the decoding application is used to process the received video data in the first data format based on the data format supported by the client device for playback to acquire video data in a second data format.

S650, receiving video data in the second data format through the camera peripheral device, and transmitting the video data in the second data format to the conferencing software through the camera peripheral device.

S660, when it is recognized that the client device is not running the decoding application, transmitting second notification information to the screen sharing receiving device, where the second notification information is used to notify the screen sharing receiving device to process the received original video data based on the data format supported by the client device for playback to acquire video data in a third data format.

S670, receiving video data in the third data format through the camera peripheral device, and transmitting the video data in the third data format to the conferencing software through the camera peripheral device.

Figure 7:
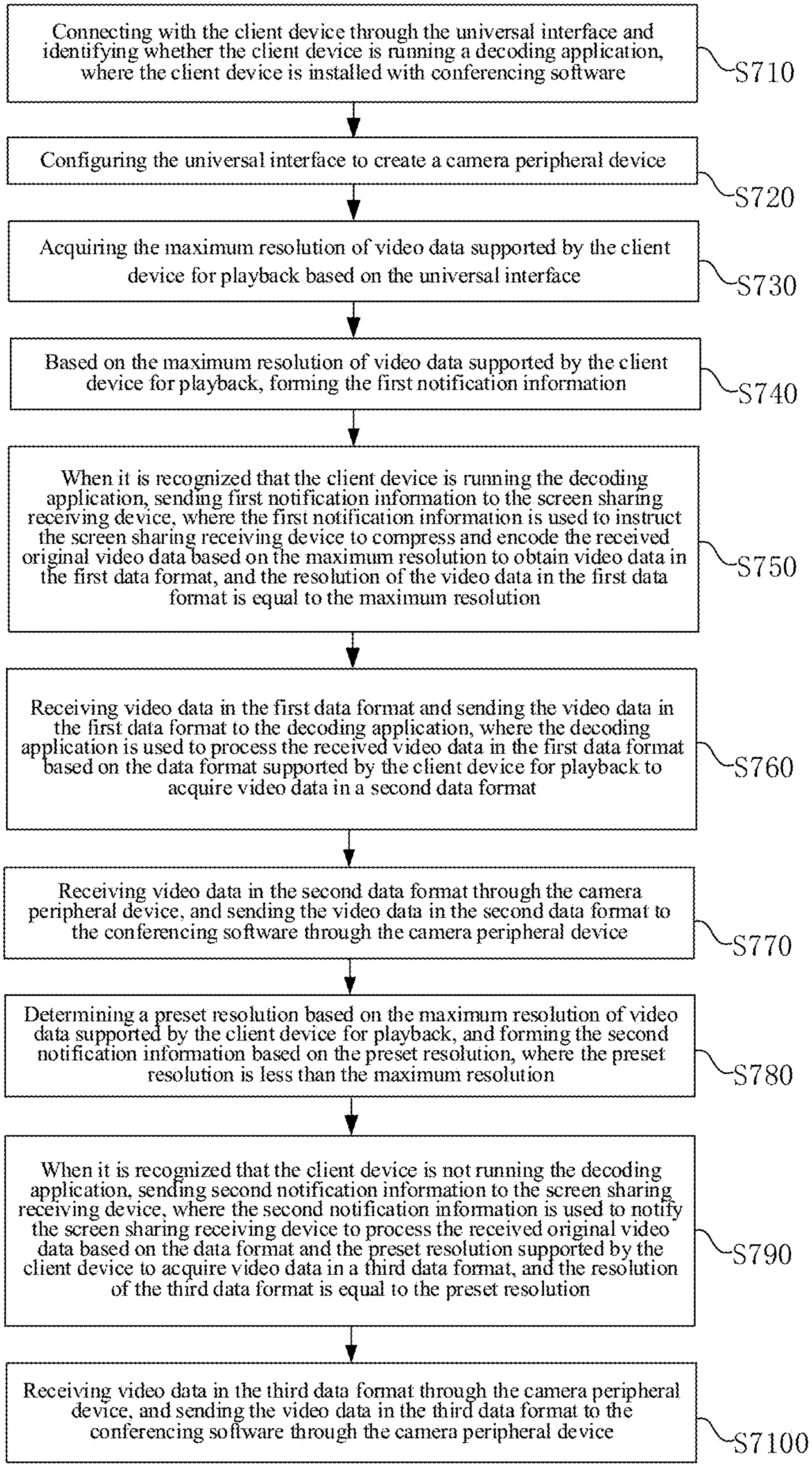
FIG. 7 shows a fourth flowchart of a video data transmission method according to an embodiment of the present disclosure.

As shown in FIG. 7, FIG. 7 shows a fourth flowchart of a video data transmission method according to an embodiment of the present disclosure, the video data transmission method specifically includes:

S710, connecting with the client device through the universal interface and identifying whether the client device is running a decoding application, where the client device is installed with conferencing software.

S720, configuring the universal interface to create a camera peripheral device.

S730, acquiring the maximum resolution of video data supported by the client device for playback based on the universal interface.

S740, based on the maximum resolution of video data supported by the client device for playback, forming the first notification information.

S750, when it is recognized that the client device is running the decoding application, transmitting first notification information to the screen sharing receiving device, where the first notification information is used to instruct the screen sharing receiving device to compress and encode the received original video data based on the maximum resolution to obtain video data in the first data format, and the resolution of the video data in the first data format is equal to the maximum resolution.

S760, receiving video data in the first data format and transmitting the video data in the first data format to the decoding application, where the decoding application is used to process the received video data in the first data format based on the data format supported by the client device for playback to acquire video data in a second data format.

S770, receiving video data in the second data format through the camera peripheral device, and transmitting the video data in the second data format to the conferencing software through the camera peripheral device.

S780, determining a preset resolution based on the maximum resolution of video data supported by the client device for playback, and forming the second notification information based on the preset resolution, where the preset resolution is less than the maximum resolution.

S790, when it is recognized that the client device is not running the decoding application, transmitting second notification information to the screen sharing receiving device, where the second notification information is used to notify the screen sharing receiving device to process the received original video data based on the data format and the preset resolution supported by the client device to acquire video data in a third data format, and the resolution of the third data format is equal to the preset resolution.

S7100, receiving video data in the third data format through the camera peripheral device, and transmitting the video data in the third data format to the conferencing software through the camera peripheral device.

The preset resolution may be determined based on the data transmission capacity of the existing wireless communication network, for example, the preset resolution may be set to 720P.

It may be understood that in the embodiment of the present disclosure, when the decoding application may be run on the computer side, the encoding manner of the original video data may be adjusted by triggering the interactive tablet 21 through the wireless screen sharing device based on the maximum resolution of video data supported by the computer, so that the wireless screen sharing device may present the video data in the second data format to the conferencing software based on the maximum resolution supported by the computer; when the decoding application fails to run properly on the computer side, the original video data may be encoded based on the preset resolution. If the preset resolution is less than the maximum resolution supported by the computer for playback, the data amount of the third data format may be reduced by reducing the resolution, reducing the impact of slow transmission speed and computer video playback lag caused by the large data amount of the video data in the third data format.

In some embodiments, the configuring the universal interface to create a camera peripheral device may include: configuring the universal interface to create a network card device and a camera peripheral device.

The receiving video data in the first data format and transmitting the video data in the first data format to the decoding application, where the decoding application is used to process the received video data in the first data format based on the data format supported by the client device for playback to acquire video data in a second data format may include: receiving the video data in the first data format and transmitting the video data in the first data format to the network card device; transmitting the video data in the first data format to the decoding application through the network card device, where the decoding application is used to process the received video data in the first data format based on the data format supported by the client device for playback to acquire the video data in the second data format.

In some embodiments, the universal interface includes a USB interface, the configuring the universal interface to create a network card device and a camera head peripheral includes: transmitting a USB description message to the client device through the USB interface to enable the client device to match the camera head driver and network card driver based on the USB description message; in response to the installation of the camera head driver and network card driver, creating a network card device and USB camera peripheral device based on the USB interface.

The camera head driver is a universal driver or a driver customized by the supplier; the network card driver is a universal driver or a driver customized by the supplier.

In some embodiments, the receiving video data in the second data format and presenting the received video data in the second data format to the conferencing software may include:

- receiving video data in the second data format through a network card device, and transmitting the received video data in the second data format to the camera peripheral device; and
- the camera peripheral device presenting the received video data in the second data format to the conferencing software.

The video data transmission method according to the above embodiments may be executed in the wireless screen sharing device and conferencing system according to any embodiment of the present disclosure. Technical details not described in detail in the above embodiments may be found in the relevant description of the wireless screen sharing device and conferencing system according to any embodiment of the present disclosure, and will not be repeated here.

Figure 8:
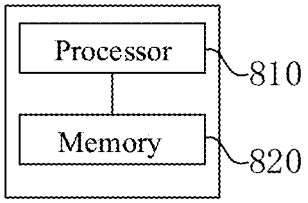
FIG. 8 is a schematic diagram of a structure of an electronic device according to an embodiment of the present disclosure.

As shown in FIG. 8, FIG. 8 is a schematic diagram of a structure of a wireless screen sharing device according to the embodiment of the present disclosure, and the wireless screen sharing device includes a processor 810 and a memory 820. The number of processors in the electronic device may be one or more, and the number of memory 820 in the wireless screen sharing device may be one or more. The processor 810 and memory 820 of the wireless screen sharing device may be connected through a bus or other means.

The memory 820, as a computer-readable storage medium, may be used to store software programs, computer executable programs, and modules, such as program instructions/modules corresponding to the video data transmission method according to any embodiment of the present disclosure. The memory 820 may mainly include a storage program area and a storage data area, the storage program area may store the program required by the operating system and at least one function, and the storage data area may store data created based on device usage, etc. In addition, memory 820 may include high-speed random access memory and may further include non-volatile memory, such as at least one disk storage device, flash memory device, or other non-volatile solid-state storage device. In some instances, the memory 820 may further include memories remotely set relative to the processor, these remote memories may be connected to the device through a network. Examples of the above networks include but are not limited to the Internet, enterprise intranet, local area network, mobile communication network and their combinations.

The processor 810 executes various functional applications and data processing of the device by running software programs, instructions, and modules stored in the memory 820, that is, implementing the above-mentioned video data transmission method. The video data transmission method includes: connecting with the client device through the universal interface and identifying whether the client device is running a decoding application, where the client device is installed with conferencing software; configuring the universal interface to create a camera peripheral device; when it is recognized that the client device is running a decoding application, transmitting first notification information to the screen sharing receiving device, where the first notification information is used to instruct the screen sharing receiving device to encode the received original video data based on the first notification information to obtain video data in a first data format; receiving video data in the first data format and transmitting the video data in the first data format to the decoding application, where the decoding application is used to process the received video data in the first data format based on the data format supported by the client device for playback to acquire video data in a second data format; and receiving video data in the second data format through the camera peripheral device, and transmitting the video data in the second data format to the conferencing software through the camera peripheral device.

The wireless screen sharing device mentioned above may be used to execute the video data transmission method according to Embodiment 1, and has corresponding functions and beneficial effects.

According to the embodiment of the present disclosure, a storage medium is further provided, including computer executable instructions, the computer executable instructions are used to execute a video data transmission method when executed by a computer processor. The video data transmission method includes: connecting with the client device through the universal interface and identifying whether the client device is running a decoding application, where the client device is installed with conferencing software; configuring the universal interface to create a camera peripheral device; when it is recognized that the client device is running a decoding application, transmitting first notification information to the screen sharing receiving device, where the first notification information is used to instruct the screen sharing receiving device to encode the received original video data based on the first notification information to obtain video data in a first data format; receiving video data in the first data format and transmitting the video data in the first data format to the decoding application, where the decoding application is used to process the received video data in the first data format based on the data format supported by the client device for playback to acquire video data in a second data format; and receiving video data in the second data format through the camera peripheral device, and transmitting the video data in the second data format to the conferencing software through the camera peripheral device.

Storage medium-any type of memory device or storage device. The term "storage medium" aims to include: installation medium, such as CD-ROM, floppy disk, or magnetic tape device; computer system memory or random access memory, such as DRAM, DDR RAM, SRAM, EDO RAM, Rambus RAM, etc; non volatile memory, such as flash memory, magnetic media (such as hard drives or optical storage); registers or other similar types of memory components, etc. The storage medium may further include other types of memory or their combinations. In addition, the storage medium may be located in the first computer system in which the program is executed, or it may be located in a different second computer system, and the second computer system is connected to the first computer system through a network (such as the Internet). The second computer system may provide program instructions to the first computer for execution. The term "storage medium" may include two or more storage media residing in different locations (such as in different computer systems connected through a network). A storage medium may store program instructions that may be executed by one or more processors (for example, specifically implemented as computer programs).

Of course, the storage medium according to the embodiment of the present disclosure includes computer executable instructions, which are not limited to the video data transmission method as described above, and may also perform relevant operations in the video data transmission method according to any embodiment of the present disclosure.

The storage medium and the electronic device according to the above embodiments may execute the video data transmission method according to any embodiment of the present disclosure. Technical details not described in detail in the above embodiments may be provided in the video data transmission method according to any embodiment of the present disclosure.

The above are only the preferred embodiments and technical principles used in the present disclosure. The present disclosure is not limited to the specific embodiments described herein, and any significant changes, readjustments, and substitutions that may be made to those skilled in the art will not deviate from the scope of protection of the present disclosure. Therefore, although the above embodiments have provided a more detailed explanation of the present disclosure, the present disclosure is not limited to the above embodiments. Without departing from the concept of the present disclosure, it may also include more equivalent embodiments, and the scope of the present disclosure is determined by the scope of the claims.

What is claimed is:

1. A method for video data transmission, applied to a wireless screen sharing device comprising an interface, wherein the wireless screen sharing device does not have video decoding capability, the wireless screen sharing device is used to be connected with a screen sharing receiving device, and the screen sharing receiving device is connected to a camera head for receiving original video data, the method comprising:

connecting with a client device through the interface;

identifying whether the client device is running a decoding application, where the client device is installed with conferencing software;

configuring the interface to create a camera peripheral device;

when it is recognized that the client device is running a decoding application, transmitting first notification information to the screen sharing receiving device, wherein the first notification information is used to instruct the screen sharing receiving device to encode received original video data based on the first notification information to obtain video data in a first data format;

receiving the video data in the first data format;

transmitting the video data in the first data format to the decoding application, wherein the decoding application is used to process received video data in the first data format based on a data format supported by the client device to acquire video data in a second data format;

receiving the video data in the second data format; and presenting the video data in the second data format to the conferencing software through the camera peripheral device; or when it is recognized that the client device is not running the decoding application, transmitting second notification information to the screen sharing receiving device, wherein the second notification information is used to notify the screen sharing receiving device to process the received original video data based on the data format supported by the client device to acquire video data in a third data format;

receiving the video data in the third data format through the camera peripheral device; and transmitting the video data in the third data format to the conferencing software through the camera peripheral device.

2. The method of claim 1, wherein when it is recognized that the client device is running a decoding application, transmitting the first notification information to the screen sharing receiving device, wherein the first notification information is used to instruct the screen sharing receiving device to encode the received original video data based on the first notification information to obtain video data in the first data format comprises:

acquiring a maximum resolution of video data supported by the client device based on the interface;

based on the acquired maximum resolution of video data supported by the client device, forming the first notification information;

when it is recognized that the client device is running the decoding application, transmitting the first notification information to the screen sharing receiving device, wherein the first notification information is used to instruct the screen sharing receiving device to encode the received original video data based on the first notification information to obtain video data in the first data format, wherein:

a resolution of the video data in the first data format is equal to the maximum resolution, and a resolution of the video data in the second data format is equal to the maximum resolution.

3. The method of claim 1, wherein when it is recognized that the client device is not running the decoding application, transmitting the second notification information to the screen sharing receiving device, wherein the second notification information is used to notify the screen sharing receiving device to process the received original video data based on the data format supported by the client device to acquire video data in the third data format comprises:

determining a preset resolution based on a maximum resolution of video data supported by the client device;

forming the second notification information based on the preset resolution, wherein the preset resolution is less than the maximum resolution; and when it is recognized that the client device is not running the decoding application, transmitting the second notification information to the screen sharing receiving device, wherein the second notification information is used to notify the screen sharing receiving device to process the received original video data based on the data format and the preset resolution supported by the client device to acquire video data in the third data format, and a resolution of the third data format is equal to the preset resolution.

4. The method of claim 1, wherein the configuring the interface to create the camera peripheral device comprises: configuring the interface to create a network card device and the camera peripheral device;

the receiving the video data in the first data format; and the transmitting the video data in the first data format to the decoding application, wherein the decoding application is used to process the received video data in the first data format based on the data format supported by the client device to acquire video data in the second data format comprises:

receiving the video data in the first data format; and transmitting the video data in the first data format to the network card device;

transmitting the video data in the first data format to the decoding application through the network card device, wherein the decoding application is used to process the received video data in the first data format based on the data format supported by the client device to acquire the video data in the second data format.

5. The method of claim 4, wherein the interface comprises a Universal Serial Bus (USB) interface, the configuring the interface to create the network card device and the camera head peripheral comprises:

transmitting a USB description message to the client device through the USB interface to enable the client device to match a camera head driver and network card driver based on the USB description message; and in response to installation of the camera head driver and the network card driver, creating the network card device and a USB camera peripheral device based on the USB interface.

6. The method of claim 5, wherein the camera head driver is a universal driver or a driver customized by a camera head supplier;

the network card driver is a universal driver or a driver customized by a network card supplier.

7. The method of claim 5, wherein the receiving the video data in the second data format through the camera peripheral device; and the presenting the received video data in the second data format to the conferencing software comprises:

receiving video data in the second data format through the network card device; and transmitting the received video data in the second data format to the camera peripheral device; and the camera peripheral device presenting the received video data in the second data format to the conferencing software.

8. The method of claim 1, wherein the configuring the interface to create the camera peripheral device comprises: configuring the interface to create a human interface device and the camera peripheral device;

the receiving the video data in the first data format; and the transmitting the video data in the first data format to the decoding application, wherein the decoding application is used to process the received video data in the first data format based on the data format supported by the client device to acquire video data in the second data format comprises:

receiving the video data in the first data format; and transmitting the video data in the first data format to the human interface device;

transmitting the video data in the first data format to the decoding application through the human interface device, wherein the decoding application is used to process the received video data in the first data format based on the data format supported by the client device to acquire the video data in the second data format.

9. The method of claim 1, wherein the video data in the first data format is video data in H264 format or video data in H265 format, and the video data in the second data format is video data in MJPEG format or video data in YUV format.

10. A conferencing system, comprising an interactive board and a wireless screen sharing device, wherein the interactive board comprises a camera head and a screen sharing receiving device, and the camera head is used to collect original video data; the screen sharing receiving device is used to transmit the original video data collected by the camera head;

the wireless screen sharing device is connected to a client device, and the client device is installed with conferencing software;

the wireless screen sharing device is configured to create a camera peripheral device, and the camera peripheral device corresponds to the camera head;

when it is recognized that the client device is running a decoding application, the wireless screen sharing device is configured to:

transmit first notification information to the screen sharing receiving device;

the screen sharing receiving device is configured to:

encode received original video data based on the first notification information to obtain video data in a first data format; and transmit the video data in the first data format to the wireless screen sharing device;

the wireless screen sharing device is configured to:

transmit received video data in the first data format to the decoding application, wherein the decoding application is used to process the received video data in the first data format based on a data format supported by the client device to obtain the video data in a second data format;

receive the video data in the second data format; and present the video data in the second data format to the conferencing software through the camera peripheral device; or when it is recognized that the client device is not running the decoding application, the wireless screen sharing device is configured to:

transmit second notification information to the screen sharing receiving device;

the screen sharing receiving device is configured to:

based on the second notification information, process the received original video data based on the data format supported by the client device to acquire video data in a third data format;

transmit the video data in the third data format to the wireless screen sharing device;

the wireless screen sharing device is configured to:
receive the video data in the second data format; and
present the video data to the conferencing software through the camera peripheral device.

11. The conferencing system of claim 10, wherein the wireless screen sharing device is configured to:
acquire a maximum resolution of video data supported by the client device based on an interface; and
based on an acquired maximum resolution of video data supported by the client device for playback, form the first notification information.

12. The conferencing system of claim 11, wherein when it is recognized that the client device is running the decoding application, the wireless screen sharing device is configured to:
transmit the first notification information to the screen sharing receiving device; and
the screen sharing receiving device is configured to:
encode the received original video data based on the first notification information to obtain the video data in the first data format, wherein:
a resolution of the video data in the first data format is equal to the maximum resolution; and
a resolution of the video data in the second data format is equal to the maximum resolution.

13. The conferencing system of claim 11, wherein the wireless screen sharing device is configured to:
determine a preset resolution based on the acquired maximum resolution of video data supported by the client device, and
form the second notification information based on the preset resolution, wherein the preset resolution is less than the maximum resolution; and
when it is recognized that the client device is not running the decoding application, transmit the second notification information to the screen sharing receiving device; and
the screen sharing receiving device is configured to:
based on the second notification information, process the received original video data based on the data format supported by the client device and the preset resolution to acquire video data in the third data format, wherein a resolution of the third data format is equal to the preset resolution.

14. The conferencing system of claim 10, wherein the wireless screen sharing device is configured to:
create a network card device; and
transmit the received video data in the first data format to the decoding application through the network card device.

15. The conferencing system of claim 14, wherein the network card device is a Universal Serial Bus (USB) network card device, and the camera peripheral device is a USB video class (UVC) device.

16. The conferencing system of claim 10, wherein the video data in the first data format is video data in H264 format or video data in H265 format, and the video data in the second data format is video data in MJPEG format or video data in YUV format.

17. A non-transitory storage medium comprising computer executable instructions, wherein the computer executable instructions, when executed by at least one computer processor, cause a wireless screen sharing device comprising an interface to perform operations, wherein the wireless screen sharing device does not have video decoding capability, the wireless screen sharing device is used to be connected with a screen sharing receiving device, and the screen sharing receiving device is connected to a camera head for receiving original video data transmitted by the camera head; and the operations comprising:
connecting with a client device through the interface and identifying whether the client device is running a decoding application, where the client device is installed with conferencing software;
configuring the interface to create a camera peripheral device;
when it is recognized that the client device is running a decoding application, transmitting first notification information to the screen sharing receiving device, wherein the first notification information is used to instruct the screen sharing receiving device to encode received original video data based on the first notification information to obtain video data in a first data format;
receiving the video data in the first data format; and
transmitting the video data in the first data format to the decoding application, wherein the decoding application is used to process received video data in the first data format based on a data format supported by the client device to acquire video data in a second data format;
receiving the video data in the second data format; and
presenting the video data in the second data format to the conferencing software through the camera peripheral device; or
when it is recognized that the client device is not running the decoding application, transmitting second notification information to the screen sharing receiving device, wherein the second notification information is used to notify the screen sharing receiving device to process the received original video data based on the data format supported by the client device to acquire video data in a third data format; and
receiving the video data in the third data format through the camera peripheral device; and
transmitting the video data in the third data format to the conferencing software through the camera peripheral device.

18. The non-transitory storage medium of claim 17, wherein when it is recognized that the client device is running a decoding application, transmitting the first notification information to the screen sharing receiving device, wherein the first notification information is used to instruct the screen sharing receiving device to encode the received original video data based on the first notification information to obtain video data in the first data format comprises:
acquiring a maximum resolution of video data supported by the client device based on the interface;
based on the acquired maximum resolution of video data supported by the client device for playback, forming the first notification information;
when it is recognized that the client device is running the decoding application, transmitting the first notification information to the screen sharing receiving device, wherein the first notification information is used to instruct the screen sharing receiving device to encode the received original video data based on the first notification information to obtain video data in the first data format, wherein:
a resolution of the video data in the first data format is equal to the maximum resolution; and
a resolution of the video data in the second data format is equal to the maximum resolution.

19. The non-transitory storage medium of claim 17, wherein when it is recognized that the client device is not running the decoding application, transmitting the second notification information to the screen sharing receiving device, wherein the second notification information is used to notify the screen sharing receiving device to process the received original video data based on the data format supported by the client device to acquire video data in the third data format comprises:

determining a preset resolution based on a maximum resolution of video data supported by the client device for playback;

forming the second notification information based on the preset resolution, wherein the preset resolution is less than the maximum resolution; and when it is recognized that the client device is not running the decoding application, transmitting the second notification information to the screen sharing receiving device, wherein the second notification information is used to notify the screen sharing receiving device to process the received original video data based on the data format and the preset resolution supported by the client device to acquire video data in the third data format, and a resolution of the third data format is equal to the preset resolution.

20. The non-transitory storage medium of claim 17, wherein the configuring the interface to create the camera peripheral device comprises: configuring the interface to create a network card device and the camera peripheral device;

the receiving the video data in the first data format; and the transmitting the video data in the first data format to the decoding application, wherein the decoding application is used to process the received video data in the first data format based on the data format supported by the client device to acquire video data in the second data format comprises:

receiving the video data in the first data format; and transmitting the video data in the first data format to the network card device;

transmitting the video data in the first data format to the decoding application through the network card device, wherein the decoding application is used to process the received video data in the first data format based on the data format supported by the client device to acquire the video data in the second data format.

* * * * *